(12) United States Patent
Chen et al.

(10) Patent No.: US 11,468,311 B2
(45) Date of Patent: *Oct. 11, 2022

(54) MICRO-PROCESSOR CIRCUIT AND METHOD OF PERFORMING NEURAL NETWORK OPERATION

(71) Applicant: Shanghai Zhaoxin Semiconductor Co., Ltd., Shanghai (CN)

(72) Inventors: Jing Chen, Beijing (CN); Xiaoyang Li, Beijing (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 1044 days.

This patent is subject to a terminal disclaimer.

(21) Appl. No.: 15/928,113

(22) Filed: Mar. 22, 2018

(65) Prior Publication Data
US 2019/0213477 A1 Jul. 11, 2019

(30) Foreign Application Priority Data
Jan. 5, 2018 (CN) .......................... 201810016819.5

(51) Int. Cl.
*G06N 3/08* (2006.01)
*G06N 3/04* (2006.01)

(52) U.S. Cl.
CPC ............... *G06N 3/08* (2013.01); *G06N 3/04* (2013.01)

(58) Field of Classification Search
CPC .... G06F 9/30014; G06F 9/3016; G06F 15/80; G06F 15/8007; G06F 9/30036;
(Continued)

(56) References Cited

U.S. PATENT DOCUMENTS

2016/0026912 A1* 1/2016 Falcon ................ G06N 3/0454
706/25
2018/0046900 A1* 2/2018 Dally .................. G06F 9/30018
(Continued)

FOREIGN PATENT DOCUMENTS

CN 106203621 12/2016
CN 107169563 9/2017

OTHER PUBLICATIONS

Zhu et al., "Trained Ternary Quantization", Feb. 23, 2017, ICLR 2017, pp. 1-10 (Year: 2017).*
(Continued)

*Primary Examiner* — Brent Johnston Hoover
(74) *Attorney, Agent, or Firm* — JCIPRNET

(57) ABSTRACT

A micro-processor circuit and a method of performing neural network operation are provided. The micro-processor circuit is suitable for performing neural network operation. The micro-processor circuit includes a parameter generation module, a compute module and a compare logic. The parameter generation module receives in parallel a plurality of input parameters and a plurality of weight parameters of the neural network operation. The parameter generation module generates in parallel a plurality of sub-output parameters according to the input parameters and the weight parameters. The compute module receives in parallel the sub-output parameters. The compute module sums the sub-output parameters to generate a summed parameter. The compare logic receives the summed parameter. The compare logic performs a comparison operation based on the summed parameter to generate a plurality of output parameters of the neural network operation.

16 Claims, 7 Drawing Sheets

Receive in parallel a plurality of input parameters and a plurality of weight parameters of the neural network operation by using the parameter generation module; and generate in parallel a plurality of sub-output parameters according to the input parameters and the weight parameters — S310

Receive in parallel the sub-output parameters by using the compute module; and sum the sub-output parameters to generate a summed parameter — S320

Receive the summed parameter by using the compare logic, and perform a comparison operation based on the summed parameter to generate an output parameter of the neural network operation — S330

(58) Field of Classification Search
CPC .. G06F 9/30189; G06F 9/3885; G06F 9/3887; G06N 3/04; G06N 3/0454; G06N 3/063; G06N 3/08
See application file for complete search history.

(56) References Cited

U.S. PATENT DOCUMENTS

2019/0392299 A1* 12/2019 Ma .................. H03K 19/21
2020/0159534 A1* 5/2020 Li .................. G06N 3/0454

OTHER PUBLICATIONS

Lin et al., "Neural Networks With Few Multiplications", Feb. 26, 2016, ICLR 2016, pp. 1-9 (Year: 2016).*

* cited by examiner

MICRO-PROCESSOR CIRCUIT AND METHOD OF PERFORMING NEURAL NETWORK OPERATION

CROSS-REFERENCE TO RELATED APPLICATION

This application claims the priority benefit of China application serial no. 201810016819.5 filed on Jan. 5, 2018. The entirety of the above-mentioned patent application is hereby incorporated by reference herein and made a part of this specification.

BACKGROUND OF THE INVENTION

Field of the Invention

The invention relates to an application of a single instruction multiple data (SIMD) architecture, and particularly relates to a micro-processor circuit using such architecture and a method of performing a neural network operation.

Description of Related Art

Generally, a conventional processor executing a neural network operation requires a large storage space. In a general case, the neural network operation occupies a large storage space in a static random access memory (SRAM), or exchanges a large amount of data between the SRAM and a dynamic random access memory (DRAM). Moreover, when the processor executes a binary neural network (BNN) operation or a ternary neural network (TNN) operation, the processor outputs a parameter $$y = \sum_{i=1}^{n} w_i x_i,$$

where $w_i$ is a weight parameter of 1-bit or 2-bit, $x_i$ is input data with a bit width equal to that of $w_i$, and y is an output parameter, where the weight parameter $w_i$ of 1-bit or 2-bit and the input data $x_i$ of 1-bit or 2-bit need to be processed in collaboration with a 8-bit SIMD lane. When the processor executes a binary weight network (BWN) operation or a ternary weight network (TWN) operation, the processor outputs a parameter $$y = \sum_{i=1}^{n} w_i x_i,$$

where $w_i$ is a weight parameter of 1-bit or 2-bit, $x_i$ is 8-bit input data, and y is an output parameter, where the weight parameter $w_i$ of 1-bit or 2-bit needs to be processed in collaboration with the 8-bit SIMD lane. Therefore, the conventional method of executing the neural network operation adopted by the processor may cause a waste of computation resource. Therefore, several resolutions are provided below to resolve the above problem.

SUMMARY OF THE INVENTION

The invention is directed to a micro-processor circuit and a method of performing a neural network operation, which are adapted to effectively save a computation resource of the neural network operation.

The invention provides a micro-processor circuit adapted to perform a neural network operation. The micro-processor circuit includes a parameter generation module, a compute module and a compare logic. The parameter generation module receives in parallel a plurality of input parameters and a plurality of weight parameters of the neural network operation. The parameter generation module generates in parallel a plurality of sub-output parameters according to the input parameters and the weight parameters. The compute module is coupled to the parameter generation module. The compute module receives in parallel the sub-output parameters. The compute module sums the sub-output parameters to generate a summed parameter. The compare logic is coupled to the compute module. The compare logic receives the summed parameter. The compare logic performs a comparison operation based on the summed parameter to generate an output parameter of the neural network operation.

The invention provides a method of performing a neural network operation, which is adapted to a micro-processor circuit. The micro-processor circuit includes a parameter generation module, a compute module and a compare logic. The method includes following steps: receiving in parallel a plurality of input parameters and a plurality of weight parameters of the neural network operation by the parameter generation module; generating in parallel a plurality of sub-output parameters by the parameter generation module according to the input parameters and the weight parameters; receiving in parallel the sub-output parameters by the compute module, and summing the sub-output parameters to generate a summed parameter; receiving in parallel the summed parameter by the compare logic, and performing a comparison operation based on the summed parameter to generate an output parameter of the neural network operation.

According to the above description, the micro-processor circuit and the method of performing the neural network operation of the invention are adapted to apply the single instruction multiple data (SIMD) architecture, and when the micro-processor circuit executes the binary neural network (BNN) operation or the ternary neural network (TNN) operation, a very high parallelism is achieved, so as to effectively save the computation resource of the neural network operation.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
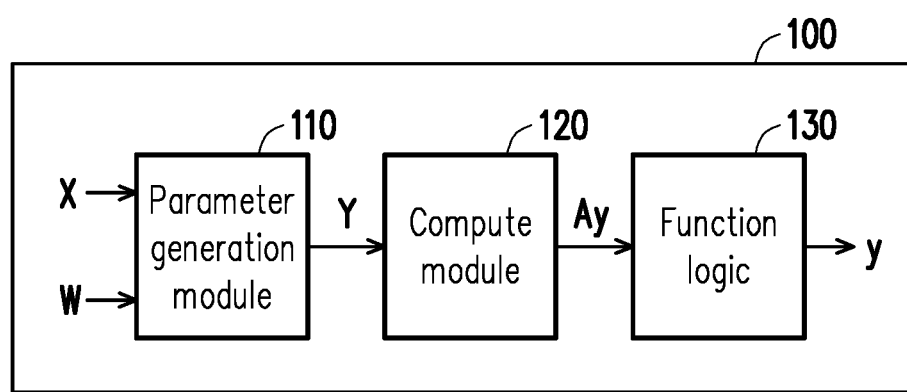
FIG. 1 is a schematic diagram of a micro-processor circuit according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a micro-processor circuit according to an embodiment of the invention. Referring to FIG. 1, the micro-processor circuit 100 includes a parameter generation module 110, a compute module 120 and a function logic 130. The parameter generation module 110 is coupled to the compute module 120. The compute module 120 is coupled to the function logic 130. In the present embodiment, the micro-processor circuit 100 is, for example, a general-purpose processor (GPP), and the micro-processor circuit 100 integrates one or a plurality of processing units to execute corresponding operation tasks. In the present embodiment, the micro-processor circuit 100 applies a single instruction multiple data (SIMD) architecture to execute micro-instructions or μop of a neural network operation to implement the corresponding neural network operation, and the micro-processor circuit 100 is a hardware circuit included in an execution unit of a processor core. It should be noted that the micro-instructions mentioned in the present embodiment refer to instructions that may be directly executed by a micro-processor including the micro-processor circuit 100. The micro-processor is, for example, a superscalar disorder execution processor of a complex instruction-set computer (CISC) instruction set architecture, a processor of a reduced instruction-set computer (RISC) instruction set architecture, a proprietary architecture processor designed for the neural network operation or a processor of other architecture.

In the present embodiment, when the micro-processor circuit 100 executes the neural network operation, the parameter generation module 110 receives in parallel input data X and weight data W of the neural network operation, and the parameter generation module 110 generates sub-output data Y to the compute module 120 according to the input data X and the weight data W. In the present embodiment, the input data X, the weight data W and the sub-output data Y may respectively include a plurality of values. In the present embodiment, the input data X includes a plurality of parallel input parameters ($x_1$, $x_2$-$x_n$). The weight data W includes a plurality of parallel weight parameters ($w_1$, $w_2$-$w_n$). The sub-output data Y includes a plurality of parallel sub-output parameters ($y_1$, $y_2$-$y_n$). In the present embodiment, the parameter generation module 110, for example, generates in parallel the sub-output parameters ($y_1$, $y_2$-$y_n$) according to the parallel input parameters ($x_1$, $x_2$-$x_n$) and the parallel weight parameters ($w_1$, $w_2$-$w_n$) through a look-up table or a specific logic circuit.

In the present embodiment, the compute module 120 receives in parallel the sub-output data Y including the sub-output parameters ($y_1$, $y_2$-$y_n$) provided by the parameter generation module 110, and computes the sub-output parameters ($y_1$, $y_2$-$y_n$). The compute module 120 performs a parallel computing to the sub-output data Y having a plurality of values. For example, the compute module 120 includes one or a plurality of adders, so as to sum the plurality of values ($y_1$, $y_2$-$y_n$) of the sub-output parameter Y through the adders, and generate a summed parameter Ay. Namely, in the present embodiment, the compute module 120 performs in parallel an adding operation to the sub-output parameters ($y_1$, $y_2$-$y_n$) having a plurality of values, so as to effectively generate the summed parameter Ay.

In the present embodiment, the function logic 130 is a hardware structure composed of one or a plurality of operative logic sets. The function logic 130 is, for example, a compare logic or a truncation logic, etc. The function logic 130 receives the summed parameter Ay provided by the compute module 120, where the summed parameter Ay may be a single value. The function logic 130 performs a specific function operation to the summed parameter Ay to generate an output parameter y of the neural network operation. Namely, the micro-processor circuit 100 of the present embodiment directly executes a micro-instruction or μop to effectively generate the output parameter y of the neural network operation.

For example, the aforementioned micro-instruction or μop is, for example, "MAC, Dst, Scr1, Scr2, size 1, size 2, size 3". In an embodiment, the micro-processor circuit 100 may execute a single such micro-instruction to complete a specific neural network operation $$y = \sum_{i=1}^{n} w_i x_i,$$

where the field "MAC" is an operating code. The micro-processor circuit 100 identifies the operating code to start processing the micro-instruction. It should be noted that the micro-processor circuit 100 is only a part of an execution unit of the micro-processor, and the execution unit of the micro-processor may include other executive circuits executing other types of instructions. In the aforementioned micro-instruction, the field "Scr1" is used for indicating a source operand of the micro-instruction, and includes the aforementioned input parameters ($x_1$, $x_2$-$x_n$). The field "Scr2" is used for indicating another source operand of the micro-instruction, and includes the aforementioned weight parameters ($w_1$, $w_2$-$w_n$). The field "Dst" is used for indicating a destination operand of the micro-instruction, and acquires the output parameter y of the neural network operation. The field "size 1" is used for indicating a bit width of each of the input parameters ($x_1$, $x_2$-$x_n$). The field "size 2" is used for indicating a bit width of each of the weight parameters ($w_1$, $w_2$-$w_n$). The field "size 3" is used for indicating a bit width of the output parameter. However, the aforementioned format of the micro-instruction is only an example, and the invention is not limited thereto.

Further, an implementation architecture of the micro-processor circuit 100 of the present embodiment is, for example, adapted to execute a neural network operation such as a binary neural network (BNN) operation, a ternary neural network (TNN) operation, a binary weight network (BWN) operation, a ternary weight network (TWN) operation, etc. In the BNN operation and the TNN operation, the bit width of each of the input parameters ($x_1$, $x_2$-$x_n$) is equal to the bit width of each of the weight parameters ($w_1$, $w_2$-$w_n$), for example, 2-bit, and the bit width of the output parameter y is also, for example, 2-bit. In the BWN operation and the TWN operation, the bit width of each of the weight parameters $w_i$ is, for example, 2-bit, and the bit width of each of the input parameters ($x_1$, $x_2$-$x_n$) is greater than the bit width of each of the weight parameters ($w_1$, $w_2$-$w_n$), which are, for example, all 8-bit. Namely, the bit widths "size 1" and "size 2" of the two source operands of the BNN operation and the TNN operation are the same. The bit widths "size 1" and "size 2" of the two source operands of the BWN operation and the TWN operation are different, and the "size 1" is greater than the "size 2". Therefore, a bit width (for example, 256/128-bit) of the micro-processor circuit 100 of the invention is greater than a sum of the bit widths of all the input parameters ($x_1$, $x_2$-$x_n$) and all the weight parameters ($w_1$, $w_2$-$w_n$).

In the present embodiment, the micro-processor circuit 100 receives in parallel the relatively short input parameters ($x_1$, $x_2$-$x_n$) and the weight parameters ($w_1$, $w_2$-$w_n$) of the neural network operation to execute the operation of $$y = \sum_{i=1}^{n} w_i x_i,$$

such that the micro-processor circuit 100 is adapted to the characteristics of the neural network operation of large amount of data and short bit width of data to implement the parallel computing. Therefore, the micro-processor circuit 100 of the present embodiment may effectively save an operation cycle to improve operation efficiency. In order to further describe a plurality of implementation architectures of the micro-processor circuit of the invention, the micro-processor circuits of the following embodiments are respectively described below in collaboration with the corresponding method of performing the neural network operation.

Figure 2:
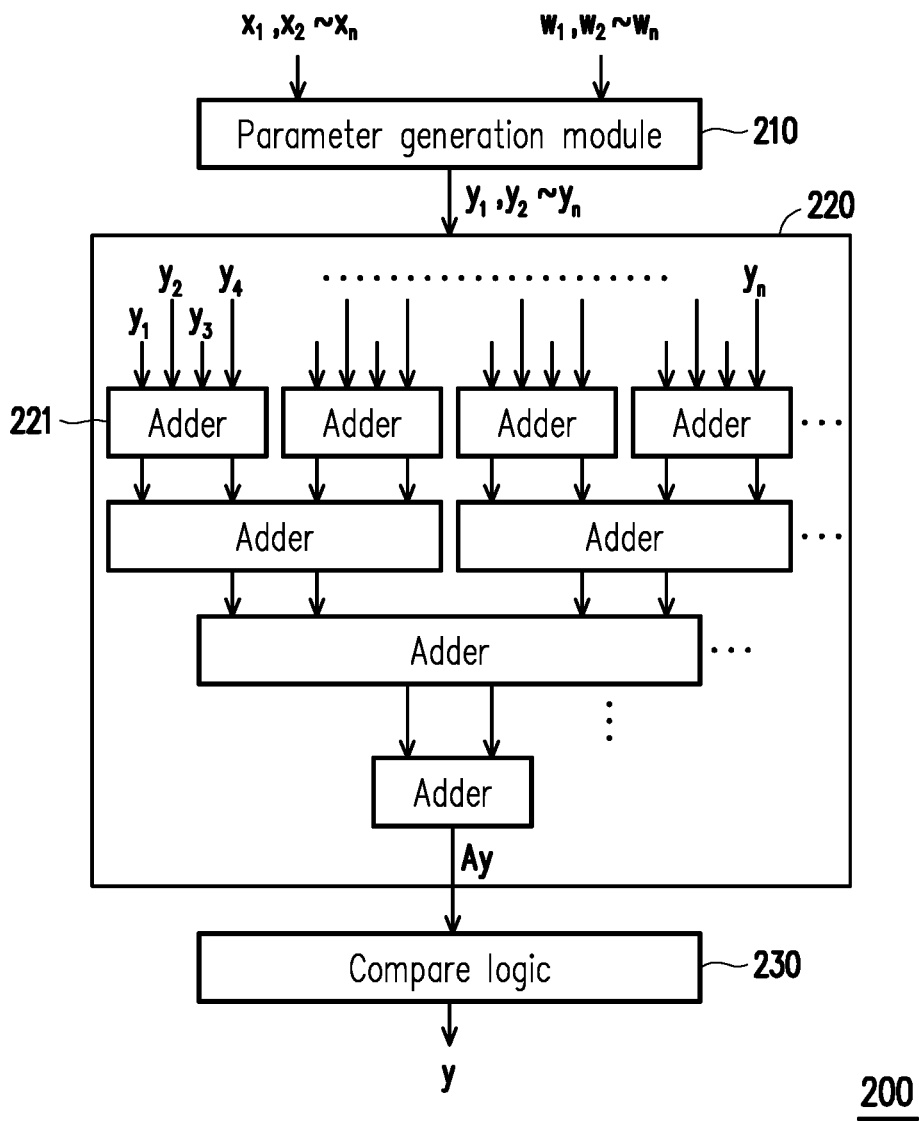
FIG. 2 is a schematic diagram of a micro-processor circuit according to a first embodiment of the invention.
Figure 3:
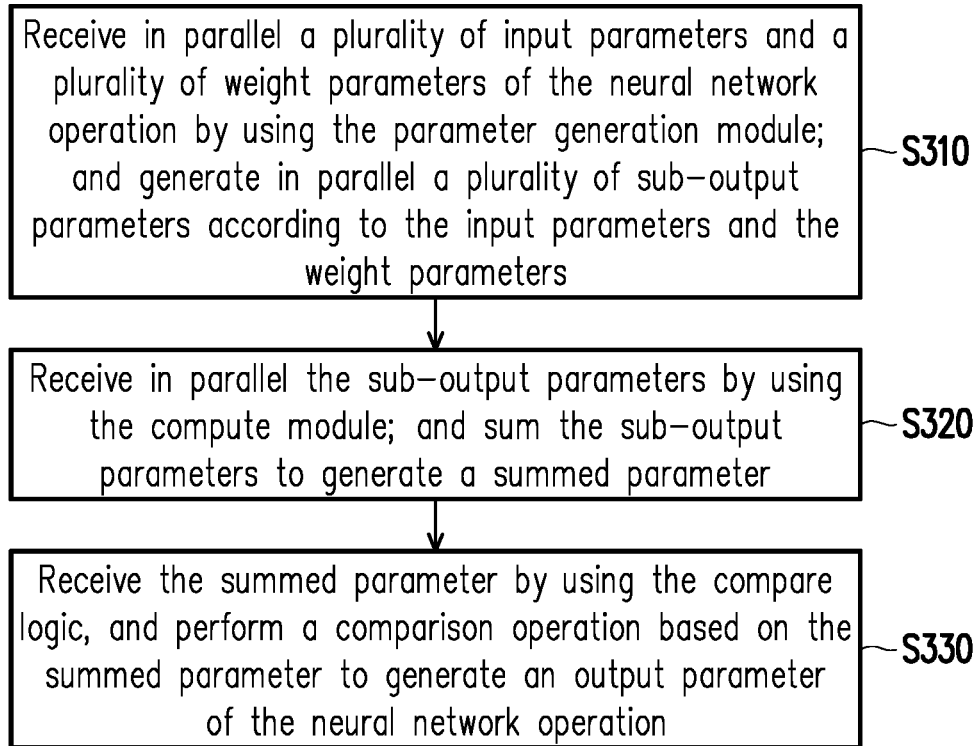
FIG. 3 is a flowchart illustrating a method of performing a neural network operation according to the first embodiment of the invention.

FIG. 2 is a schematic diagram of a micro-processor circuit according to a first embodiment of the invention. FIG. 3 is a flowchart illustrating a method of performing a neural network operation according to the first embodiment of the invention. Referring to FIG. 2 and FIG. 3, the micro-processor circuit 200 includes a parameter generation module 210, a compute module 220 and a compare logic 230. In the present embodiment, the micro-processor circuit 200 is adapted to perform the BNN operation, and the BNN operation to be implemented by the micro-processor circuit 200 is shown as a following equation (1). In the present embodiment, a value range of the input parameters $x_1$, $x_2$-$x_n$, the weight parameters $w_1$, $w_2$-$w_n$, and the output parameter y is $\{-1, 1\}$. Moreover, according to an algorithm regulation of the BNN operation, if the sum of the input parameters $x_1$, $x_2$-$x_n$ and the weight parameters $w_1$, $w_2$-$w_n$ is greater than or equal to 0 (y≥0), y=1. Conversely, y=-1.

$$y = \sum_{i=1}^{n} w_i x_i = w_1 x_1 + w_2 x_2 + w_3 x_3 + \ldots + w_n x_n, i > 1 \quad \text{Equation (1)}$$

First, in step S310, the micro-processor circuit 200 receives in parallel the input parameters $x_1$, $x_2$-$x_n$ and the weight parameters $w_1$, $w_2$-$w_n$ of the neural network operation through the parameter generation module 210. The parameter generation module 210 generates a plurality of sub-output parameters $y_1$, $y_2$-$y_n$ according to the input parameters $x_1$, $X_2$-$X_n$ and the weight parameters $w_1$, $w_2$-$w_n$, where n is a positive integer greater than 0. In the present embodiment, a value range of the input parameters $x_1$, $x_2$-$x_n$ and the weight parameters $w_1$, $w_2$-$w_n$ is $\{-1,1\}$. In the present embodiment, the parameter generation module 210 pre-encodes the input parameters $x_1$, $x_2$-$x_n$ and the weight parameters $w_1$, $w_2$-$w_n$, where an encoding result thereof is shown in a following table 1. Moreover, in the present embodiment, values of the encoded input parameters $x_1$, $x_2$-$x_n$, the encoded weight parameters $w_1$, $w_2$-$w_n$, and the corresponding sub-output parameters $y_1$, $y_2$-$y_n$ are shown in a following table 2 (a first look-up table), where $i \in \{1, 2, 3, \ldots, n\}$.

TABLE 1

| $w_i$, $x_i$ | $w_i$, $x_i$ (Encoded) |
|---|---|
| -1 | 0 |
| 1 | 1 |

TABLE 2

| $w_i$ (Encoded) | $x_i$ (Encoded) | $y_i$ |
|---|---|---|
| 0 | 0 | 1 |
| 0 | 1 | 0 |
| 1 | 0 | 0 |
| 1 | 1 | 1 |

In the present embodiment, the parameter generation module 210 obtains in parallel all of the sub-output parameters $y_1$, $y_2$-$y_n$ according to the above table 2, though the invention is not limited thereto. In an embodiment, the parameter generation module 210 may adopt other encoding method to generate the sub-output parameters $y_1$, $y_2$-$y_n$, for example, 1 is encoded to 1, -1 is encoded to 0. In an embodiment, the parameter generation module 210 may also obtain the corresponding sub-output parameters $y_1$, $y_2$-$y_n$ according to a digital logic circuit (a first logic circuit) corresponding to a following equation (2). As shown in FIG. 2, the parameter generation module 210 may include the first logic circuit. In the present embodiment, a symbol "~" and a symbol "^" in the equation (2) are symbols of operators, which respectively represent "INV" and "XOR". However, the invention is not limited thereto, for example, in an implementation that the input parameter $x_i$ or the weight parameter $w_i$ with a value of 1 is encoded to 1, and the input parameter $x_i$ or the weight parameter $w_i$ with a value of -1 is encoded to 0, a digital logic circuit corresponding to another equation $y_i = w_i \wedge x_i$ may be adopted to obtain the corresponding sub-output parameters $y_1$, $y_2$-$y_n$.

$$y_i = \sim(w_1 \wedge x_i) \quad \text{equation (2)}$$

Then, in step S320, the micro-processor circuit 200 receives in parallel the sub-output parameters $y_1$, $y_2$-$y_n$ through the compute module 220, and sums the sub-output parameters $y_1$, $y_2$-$y_n$ to generate the summed parameter Ay. In the present embodiment, the compute module 220 includes a plurality of adders 221. The compute module 220 simultaneously performs the adding operation to the sub-output parameters $y_1$, $y_2$-$y_n$. For example, a first layer of the adders 221 performs the adding operation to every four batches of data of the sub-output parameters $y_1$, $y_2$-$y_n$, and provides adding results to a second layer of the adders 221. Deduced by analogy, the last layer of the adders 221 may output the summed parameter Ay. In the present embodiment, each of the adders 221 may be implemented by a basic 4:2 carry save adder (CSA), and each CSA adder includes 4 inputs and 2 outputs (including sum and carry). However, the number of the adders 221 and the number of layers of the adders 221 of the compute module 220 may be correspondingly designed according to the number of the sub-output parameters $y_1$, $y_2$-$y_n$, and configuration method of the adders 221 of the compute module 220 of the invention is not limited to that shown in FIG. 2.

In the present embodiment, since in the algorithm of the BNN operation, the value range of the input parameters $x_1$, $x_2$-$x_n$ and the weight parameters $w_1$, $w_2$-$w_n$ is $\{-1, 1\}$, i.e. there are only two types of values "−1" and "1". Therefore, the parameter generation module 210 adopts a 1-bit encoding method to encode the input parameters $x_1$, $x_2$-$x_n$ and the weight parameters $w_1$, $w_2$-$w_n$ to generate an encoded value "0" or "1". In other words, the compute module 220 uses the adder 221 to add the sub-output parameters $y_1$, $y_2$-$y_n$ to obtain the summed parameter Ay, and a purpose thereof is to obtain the number of a first value type ("1") in the sub-output parameters $y_1$, $y_2$-$y_n$. The summed parameter Ay corresponds to a multiply and add operation result of the aforementioned equation (1).

Finally, in step S330, the micro-processor circuit 200 receives the summed parameter Ay by using the compare logic 230, and the compare logic 230 performs a comparison operation based on the summed parameter Ay to generate an output parameter y of the neural network operation. In the present embodiment, the comparison logic 230 determines the number of the first value type ("1") and the number of the second value type ("0") in the sub-output parameters $y_1$, $y_2$-$y_n$ according to the summed parameter Ay, so as to determine the output parameter y to be "1" or "0". For example, the compare logic 230 may execute a following equation (3):

if the count of $(y_i=1) \geq (y_i=0), y=1$;

else, $y=0$     equation (3)

Therefore, in the BNN operation, if n=8, the compare logic 430 may compare the summed parameter Ay (to be greater than, equal to or smaller than) with a value "4", so as to determine the output parameter y to be "0" (original value −1) or "1" (original value 1). In this example, if the summed parameter Ay is greater than or equal to the value "4", it represents that the number of the first value type "1" in the sub-output parameters $y_1$, $y_2$-$y_n$ is greater than or equal to the number of the second value type "0". Namely, since the number of the original values of "1" in the sub-output parameters $y_1$, $y_2$-$y_n$ is great than or equal to the number of the original values of "−1", the output parameter y obtained by summing the sub-output parameters $y_1$, $y_2$-$y_n$ is a non-negative value, and the output parameter y has the value "1" (the original value 1) according to the equation (3).

However, in this example, if the summed parameter Ay is smaller than the value "4", it represents that the number of the first value type "1" in the sub-output parameters $y_1$, $y_2$-$y_n$ is smaller than the number of the second value type "0". Namely, since the number of the original values of "1" of the sub-output parameters $y_1$, $y_2$-$y_n$ is smaller than the number of the original values of "−1", the output parameter y obtained by summing the sub-output parameters $y_1$, $y_2$-$y_n$ is a negative value, and the output parameter y has the value "0" (the original value −1) according to the equation (3). The output parameter y generated by the compare logic 230 is a result of the BNN operation.

Therefore, based on the aforementioned steps S310-S330 and the architecture of the micro-processor circuit 200 of FIG. 2, the micro-processor circuit 200 of the present embodiment may adopt a resource-saving and high efficient (the present embodiment may realize multiple binary multiplications and accumulation operations executed in parallel) method to effectively execute a low-precision BNN operation. Moreover, encoding methods and determination conditions of the above table 1, the table 2, the equation (2) and the equation (3) may be adjusted according to different operation requirements, and the invention is not limited thereto.

Figure 4:
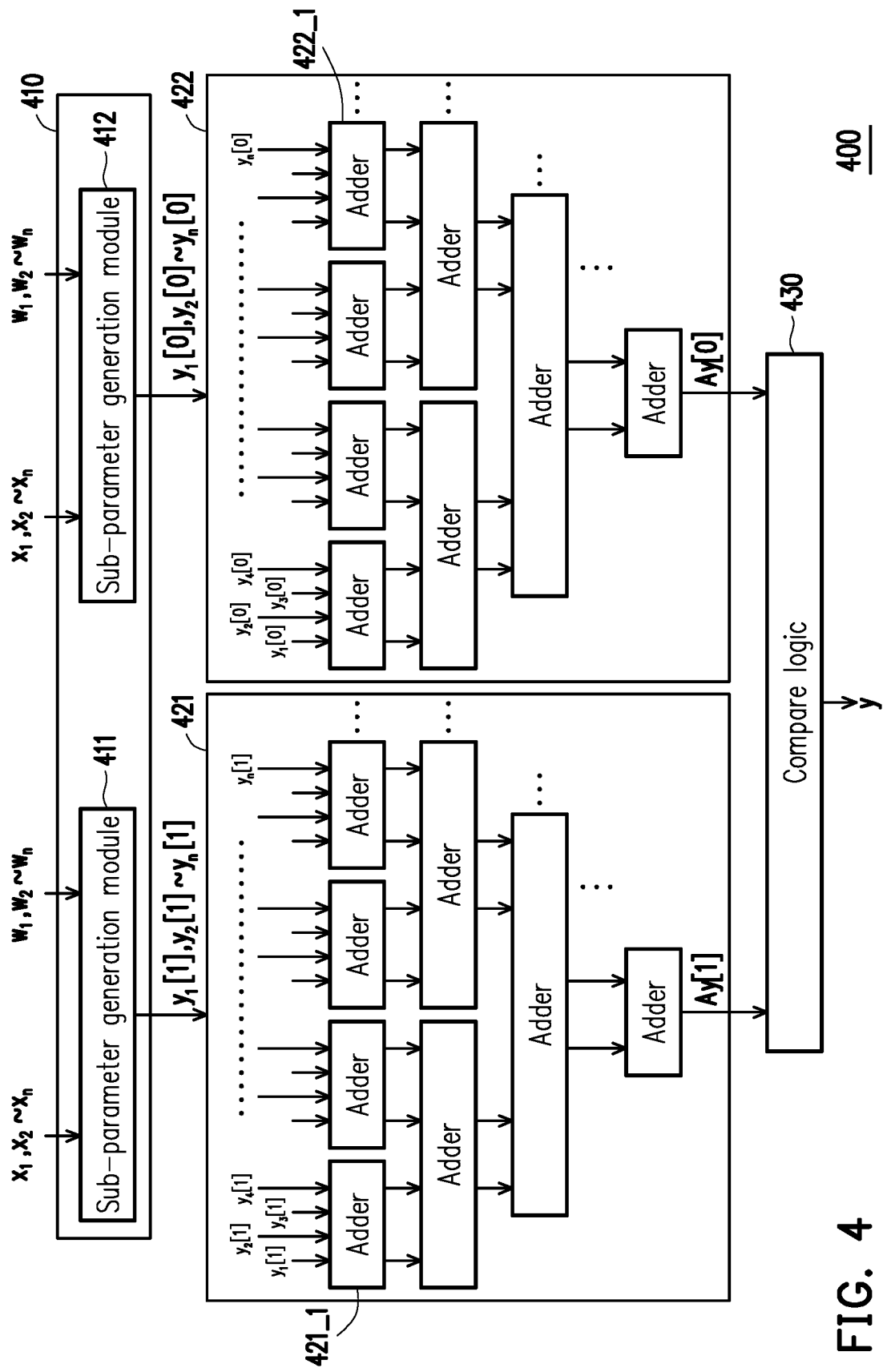
FIG. 4 is a schematic diagram of a micro-processor circuit according to a second embodiment o the invention.
Figure 5:
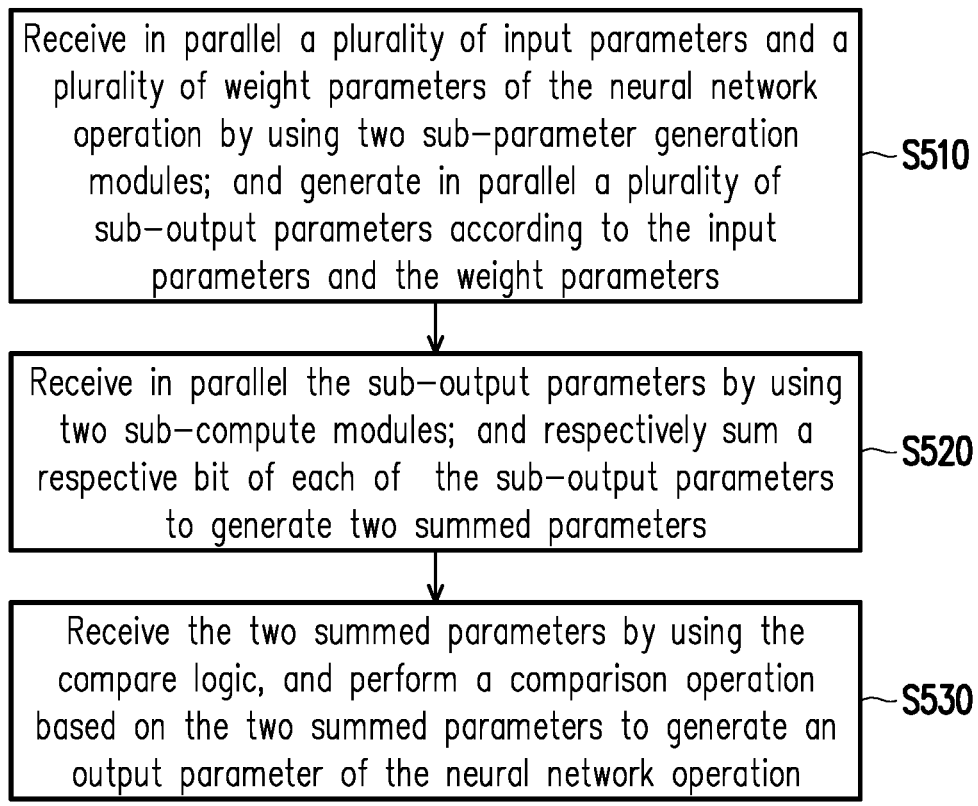
FIG. 5 is a flowchart illustrating a method of performing a neural network operation according to the second embodiment of the invention.

FIG. 4 is a schematic diagram of a micro-processor circuit according to a second embodiment o the invention. FIG. 5 is a flowchart illustrating a method of performing a neural network operation according to the second embodiment of the invention. Referring to FIG. 4 and FIG. 5, the micro-processor circuit 400 includes a parameter generation module 410, sub-compute modules 421, 422 and a compare logic 430. The parameter generation module 410 includes sub-parameter generation modules 411, 412. In the present embodiment, the micro-processor circuit 400 is adapted to execute the TNN operation, and the neural network operation to be implemented by the micro-processor circuit 400 is shown as the aforementioned equation (1). Compared to the micro-processor circuit 200 of the aforementioned embodiment, the difference is that the value range of the input parameters $x_1$, $x_2$-$x_n$, the weight parameters $w_1$, $w_2$-$w_n$ and the output parameter y is $\{-1,0,1\}$.

First, in step S510, the micro-processor circuit 400 respectively receives in parallel a plurality of input parameters $x_1$, $x_2$-$x_n$ and a plurality of weight parameters $w_1$, $w_2$-$w_n$ of the neural network operation through the two sub-parameter generation modules 411, 412. The two sub-parameter generation modules 411, 412 respectively generate a plurality of sub-output parameters $y_1[1]$, $y_2[1]$-$y_n[1]$ and $y_1[0]$, $y_2[0]$-$y_n[0]$ according to the input parameters $x_1$, $x_2$-$x_1$, and the weight parameters $w_1$, $w_2$-$w_n$, where n is a positive integer greater than 1. In the present embodiment, a value range of the input parameters $x_1$, $x_2$-$x_n$ and the weight parameters $w_1$, $w_2$-$w_1$, is $\{-1,0,1\}$. In the present embodiment, the sub-parameter generation modules 411, 412 may first encode the input parameters $x_1$, $x_2$-$x_n$ and the weight parameters $w_1$, $w_2$-$w_n$ respectively, where an encoding result thereof is shown in a following table 3. Moreover, in the present embodiment, values of the encoded input parameters $x_1$, $x_2$-$x_n$, the encoded weight parameters $w_1$, $w_2$-$w_n$, and the corresponding sub-output parameters $y_1$, $y_2$-$y_n$ are shown in a following table 4 (a second look-up table), where $i \in \{1, 2, 3, \ldots, n\}$.

TABLE 3

| $w_i, x_i$ | $w_i, x_i$ (Encoded) |
|---|---|
| −1 | 1X |
| 0 | 00 |
| 1 | 01 |

TABLE 4

| $w_i$ (Encoded) | $x_i$ (Encoded) | $y_i$ |
|---|---|---|
| 1X | 1X | 01 |
| 1X | 00 | 00 |
| 1X | 01 | 10 |
| 00 | 1X | 00 |
| 00 | 00 | 00 |
| 00 | 01 | 00 |

TABLE 4-continued

| $w_i$ (Encoded) | $x_i$ (Encoded) | $y_i$ |
|---|---|---|
| 01 | 1X | 10 |
| 01 | 00 | 00 |
| 01 | 01 | 01 |

Namely, in the present embodiment, the sub-parameter generation modules 411, 412 pre-encode the input parameters $x_1$, $x_2$-$x_n$ and the weight parameters $w_1$, $w_2$-$w_n$, and quickly obtain the corresponding sub-output parameters $y_1$, $y_2$-$y_n$ according to the above table 4. In the present embodiment, the sub-parameter generation module 411 outputs first bits (the first bit is, for example, the most significant bit) $y_1[1]$, $y_2[1]$-$y_n[1]$ of the sub-output parameters $y_1$, $y_2$-$y_n$ obtained through table look-up for representing the number of values having the first value type ("10") in the sub-output parameters $y_1$, $y_2$-$y_n$. The sub-parameter generation module 412 outputs second bits (the first bit is, for example, the least significant bit) $y_1[0]$, $y_2[0]$-$y_n[0]$ of the sub-output parameters $y_1$, $y_2$-$y_n$ obtained through table look-up for representing the number of values having the second value type ("01") in the sub-output parameters $y_1$, $y_2$-$y_n$.

Moreover, in an embodiment, the sub-parameter generation module 411 may also obtain the most significant bits $y_1[1]$, $y_2[1]$-$y_n[1]$ of the corresponding sub-output parameters $y_1$, $y_2$-$y_n$ through a digital logic circuit (a first sub-logic circuit) corresponding to a following equation (4) according to the encoded input parameters $x_1$, $x_2$-$x_n$ and the encoded weight parameters $w_1$, $w_2$-$w_n$. Moreover, the sub-parameter generation module 412 may also obtain the least significant bits $y_1[0]$, $y_2[0]$-$y_n[0]$ of the corresponding sub-output parameters $y_1$, $y_2$-$y_n$ through a digital logic circuit (a second sub-logic circuit) corresponding to a following equation (5) according to the encoded input parameters $x_1$, $x_2$-$x_n$ and the encoded weight parameters $w_1$, $w_2$-$w_n$. As shown in FIG. 4, the sub-parameter generation module 411 may include the first sub-logic circuit, and the sub-parameter generation module 412 may include the second sub-logic circuit. In the present embodiment, a symbol "~" and a symbol "&" included in the following equation (4) and the equation (5) are symbols of operators, which respectively represent "INV" and "AND".

$$y_i[1] = w_i[1] \& \sim x_i[1] \& x_i[0] + \sim w_i[1] \& w_i[0] \& x_i[1] \quad \text{equation (4)}$$

$$y_i[0] = w_i[1] \& x_i[1] + \sim w_i[1] \& w_i[0] \& \sim[1] \& x_i[0] \quad \text{equation (5)}$$

Then, in step S520, the micro-processor circuit 400 respectively receives in parallel the first bits $y_1[1]$, $y_2[1]$-$y_n[1]$ and the second bits $y_1[0]$, $y_2[0]$-$y_n[0]$ of the corresponding sub-output parameters through the sub-compute modules 421, 422. The sub-compute modules 421, 422 respectively sum the first bits $y_1[1]$, $y_2[1]$-$y_n[1]$ and the second bits $y_1[0]$, $y_2[0]$-$y_n[0]$ of the sub-output parameters to generate two summed parameters Ay[1], Ay[0]. In the present embodiment, the sub-compute module 421 includes a plurality of adders 421_1, and the sub-compute module 422 includes a plurality of adders 422_1. In the present embodiment, the sub-compute modules 421, 422 simultaneously perform adding operations respectively to the sub-output parameters $y_1[1]$, $y_2[1]$-$y_n[1]$ and $y_1[0]$, $y_2[0]$-$y_n[0]$. For example, first layers of the adders 421_1, 422_1 perform the adding operation to every four batches of data of the sub-output parameters $y_1[1]$, $y_2[1]$-$y_n[1]$ and $y_1[0]$, $y_2[0]$-$y_n[0]$, and provide adding results to a second layer of the adders 421_1, 422_1. Deduced by analogy, the last layers of the adders 421_1, 422_1 may output the two summed parameters Ay[1], Ay[0]. In the present embodiment, each of the adders 421_1, 422_1 may be implemented by a basic 4:2 carry save adder (CSA), and each CSA adder includes 4 inputs and 2 outputs (including sum and carry).

In the present embodiment, the summed parameter Ay[1] represents the number of the first value type ("10") of the sub-output parameters $y_1$, $y_2$-$y_n$, and the summed parameter Ay[0] represents the number of the second value type ("01") of the sub-output parameters $y_1$, $y_2$-$y_n$. However, the number of the adders 421_1, 422_1 and the number of layers of the adders 421_1, 422_1 of the sub-compute modules 421, 422 may be correspondingly designed according to the number of the sub-output parameters $y_1$, $y_2$-$y_n$, and configuration method of the adders 421_1, 422_1 of the sub-compute modules 421, 422 of the invention is not limited to that shown in FIG. 4.

In the present embodiment, in the TNN algorithm, since the value range of the input parameters $x_1$, $x_2$-$x_n$ and the weight parameters $w_1$, $w_2$-$w_n$ is $\{-1,0,1\}$, i.e. there are only three types of values "−1", "0" and "1", the sub-parameter generation modules 411, 412 adopt a 2-bit encoding method to encode the input parameters $x_1$, $x_2$-$x_n$ and the weight parameters $w_1$, $w_2$-$w_n$ to generate encoded values "1X", "00", "01". In an embodiment, the value "1X" may also represent "10" or "11", which is not limited by the invention. In other words, the sub-compute modules 421, 422 use the adders 421_1, 422_1 to respectively add the first bits $y_1[1]$, $y_2[1]$-$y_n[1]$ and the second bits $y_1[0]$, $y_2[0]$-$y_n[0]$ of the sub-output parameters $y_1$, $y_2$-$y_n$ to obtain the two summed parameter Ay[1], Ay[0], and a purpose thereof is to obtain the number of the first value type ("10") and the number of the second value type ("01") in the sub-output parameters $y_1$, $y_2$-$y_n$.

In order to facilitate counting the numbers of the first value type ("10") and the second value type ("01"), in an embodiment, in the sub-output parameters $y_1$, $y_2$-$y_n$ output by the sub-parameter generation modules 411, 412, the value "01" represents "1", the value "00" represents "0", and the value "10" represents "−1". Referring to the table 4, the number of the first bits $y_1[1]$, $y_2[1]$-$y_n[1]$ having the value "1" (i.e. the summed parameter Ay[1]) in the sub-output parameters $y_1$, $y_2$-$y_n$ may represent the number of the original values "−1" of the sub-output parameters $y_1$, $y_2$-$y_n$. The number of the second bits $y_1[0]$, $y_2[0]$-$y_n[0]$ having the value "1" (i.e. the summed parameter Ay[0]) in the sub-output parameters $y_1$, $y_2$-$y_n$ may represent the number of the original values "1" of the sub-output parameters $y_1$, $y_2$-$y_n$.

Finally, in step S530, the micro-processor circuit 400 receives the two summed parameters Ay[1], Ay[0] through the compare logic 430, and the micro-processor circuit 400 performs a comparison operation based on the two summed parameters Ay[1] and Ay[0] to generate an output parameter y of the neural network operation. In the present embodiment, the comparison logic 430 compares the two summed parameters Ay[1] and Ay[0] to determine the number of the first value type ("10") and the number of the second value type ("01") in the sub-output parameters $y_1$, $y_2$-$y_n$, and determine the output parameter y to be "01", "00" or "10". For example, the compare logic 430 may execute a following equation (6):

if the count of $(y_i[1]=1) > (y_i[0]=1), y=10;$ if the count of $(y_i[1]=1) < (y_i[0]=1), y=01;$     equation (6)

else, $y=00$

Therefore, in the TNN operation, if the number of the first value type "10" (corresponding to the original value −1) in the sub-output parameters $y_1$, $y_2$-$y_n$ is greater than the number of the second value type "01" (corresponding to the original value 1), the output parameter y obtained by summing all of the sub-output parameters $y_1$, $y_2$-$y_n$ is a negative value, and the output parameter y is "10" (corresponding to the original value −1) according to the equation (6). If the number of the first value type "10" (corresponding to the original value −1) in the sub-output parameters $y_1$, $y_2$-$y_n$ is smaller than the number of the second value type "01" (corresponding to the original value 1), the output parameter y obtained by summing all of the sub-output parameters $y_1$, $y_2$-$y_n$ is a positive value, and the output parameter y is "01" (corresponding to the original value 1) according to the equation (6). Otherwise, the output parameter y has the value "00" (corresponding to the original value 0). The output parameter y generated by the compare logic 430 is the result of the TNN operation of the equation (1).

In this way, based on the aforementioned steps S510-S530 and the architecture of the micro-processor circuit 400 of FIG. 4, the micro-processor circuit 400 of the present embodiment may adopt a resource-saving and high efficient (the present embodiment may achieve multiple ternary multiplications and accumulation operations executed in parallel) method to effectively execute a low-precision TNN operation. Moreover, encoding methods and determination conditions of the above table 3, the table 4, the equation (4), the equation (5) and the equation (6) may be adjusted according to different operation requirements, and the invention is not limited thereto.

Figure 6:
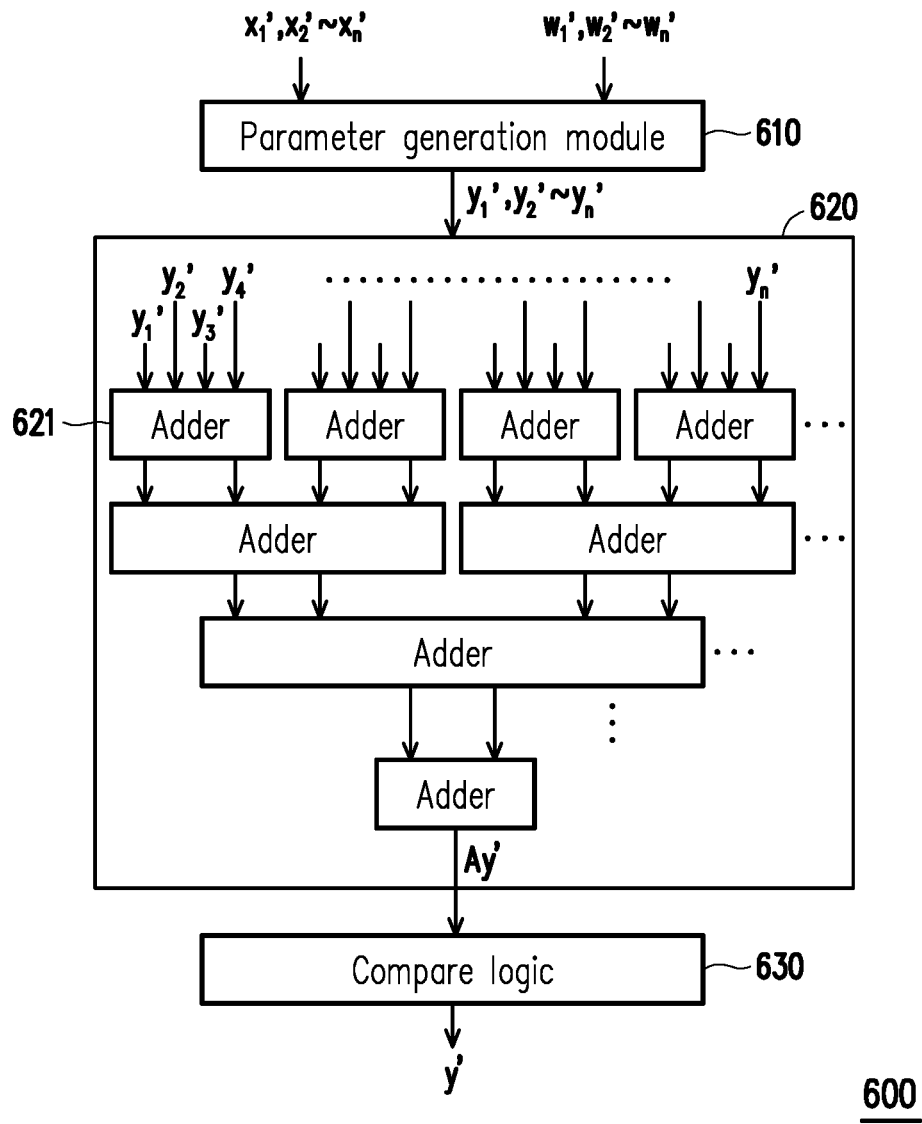
FIG. 6 is a schematic diagram of a micro-processor circuit according to a third embodiment of the invention.
Figure 7:
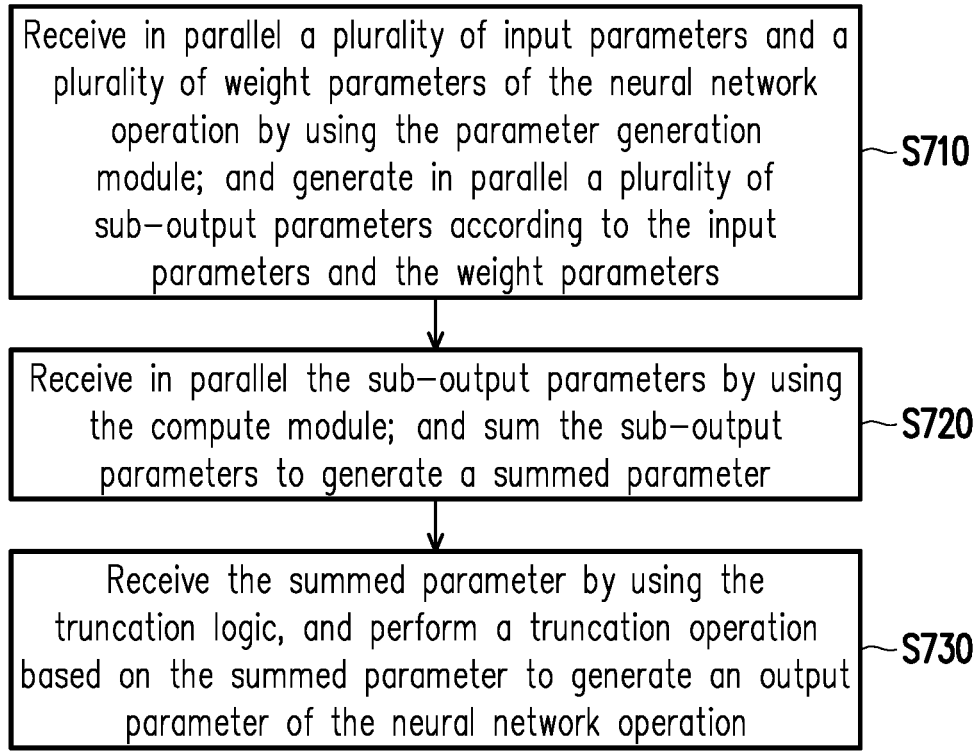
FIG. 7 is a flowchart illustrating a method of performing a neural network operation according to the third embodiment of the invention.

FIG. 6 is a schematic diagram of a micro-processor circuit according to a third embodiment of the invention. FIG. 7 is a flowchart illustrating a method of performing a neural network operation according to the third embodiment of the invention. Referring to FIG. 6 and FIG. 7, the micro-processor circuit 600 includes a parameter generation module 610, a compute module 620 and a compare logic 630. In the present embodiment, the micro-processor circuit 600 is adapted to execute the BWN operation and the TWN operation, and the neural network operation to be implemented by the micro-processor circuit 600 is shown as the aforementioned equation (1). In the BWN operation, the bit width of the weight parameters $w_1$, $w_2$-$w_n$ is 1-2 bits, and the value range of the weight parameters $w_1$, $w_2$-$w_n$ is $\{-1,1\}$. The bit widths of the input parameters $x_1$, $x_2$-$x_n$ and the output parameter y are the same. The input parameters $x_1$, $x_2$-$x_n$ and the output parameter y all have a full-bit width (for example, 8/16-bit) of an ordinary arithmetic operation of a processor including the micro-processor circuit 600. The bit widths of the input parameters $x_1$, $X_2$-$X_n$ and the output parameter y are greater than the bit width of the weight parameters $w_1$, $w_2$-$w_n$. It should be noted that the difference between the TWN operation and the BWN operation is that the value range of the weight parameters $w_1$, $w_2$-$w_n$ is $\{-1,0,1\}$ in the TWN operation, and the bit width of the micro-processor circuit 600 is greater than a sum of the bit widths of the input parameters $x_1$, $x_2$-$x_n$ and the weight parameters $w_1$, $w_2$-$w_n$.

First, in step S710, the micro-processor circuit 600 receives in parallel the input parameters $x_1$, $x_2$-$x_n$ and the weight parameters $w_1$, $w_2$-$w_n$ of the neural network operation through the parameter generation module 610. The parameter generation module 610 generates a plurality of sub-output parameters $y_1'$, $y_2'$-$y_n'$ according to the input parameters $x_1$, $x_2$-$x_n$ and the weight parameters $w_1$, $w_2$-$w_n$, where n is a positive integer greater than 0. In the present embodiment, the input parameters $x_1$, $x_2$-$x_n$ are full-bit parameters of 8-bits or 16-bit, etc. The value range of the weight parameters $w_1$, $w_2$-$w_n$ of the BWN operation is $\{-1,1\}$. The value range of the weight parameters $w_1$, $w_2$-$w_n$ of the TWN operation is $\{-1,0,1\}$.

In the present embodiment, the parameter generation module 610 pre-encodes the weight parameters $w_1$, $w_2$-$w_n$. The parameter generation module 610 encodes the weight parameters $w_1$, $w_2$-$w_n$ according to the value range of the weight parameters $w_1$, $w_2$-$w_n$. In the present embodiment, if the value range of the weight parameters $w_1$, $w_2$-$w_n$ is $\{-1,1\}$, the encoding result of the weight parameters $w_1$, $w_2$-$w_n$ is shown in a following table 5, where $i \in \{1, 2, 3, \ldots, n\}$.

TABLE 5

| $w_i$ | $w_i$ (encoded) |
|---|---|
| −1 | 0 |
| 1 | 1 |

In the present embodiment, if the value range of the weight parameters $w_1$, $w_2$-$w_n$ is $\{-1,0,1\}$ the encoding result of the weight parameters $w_1$, $w_2$-$w_n$ is shown in a following table 6, where $i \in \{1, 2, 3, \ldots, n\}$.

TABLE 6

| $w_i$ | $w_i$ (Encoded) |
|---|---|
| −1 | 1X |
| 0 | 00 |
| 1 | 01 |

In the present embodiment, the parameter generation module 610 then determines the sub-output parameters $y_1'$, $y_2'$-$y_n'$ according to the encoded input parameters $x_1$, $x_2$-$x_n$ and the weight parameters $w_1$, $w_2$-$w_n$. In the present embodiment, if the value range of the weight parameters $w_1$, $w_2$-$w_n$ is $\{-1,1\}$, the parameter generation module 610 generates the corresponding sub-output parameters according to a following equation (7) (a fourth conditional expression). It should be noted that a symbol " " in the following equation (7) and a following equation (8) is a symbol of an operator, which represents "complement".

if $w=1, y_i'=x_i$;

else, $y_i'=[x_i]$ \hfill equation (7)

In an embodiment, if the value range of the weight parameters $w_1$, $w_2$-$w_n$ is $\{-1,0,1\}$, the parameter generation module 610 generates the corresponding sub-output parameters $y_1'$, $y_2'$-$y_n'$ according to the following equation (8) (a fifth conditional expression).

if $w_i=01, y_i'=x_i$;

if $w_i=1X, y_i'=[x_i]$; \hfill equation (8)

else, $y_i'=00$

Namely, when the parameter generation module 610 determines that the value range of the weight parameters $w_1$, $w_2$-$w_n$ includes two value types, the parameter generation module 610 takes the respective original codes or complements of the input parameters $x_1$, $x_2$-$x_n$ as the sub-output parameters $y_1'$, $y_2'$-$y_n'$. When the parameter generation module 610 determines that the value range of the weight parameters $w_1$, $w_2$-$w_n$ includes three value types, the parameter generation module 610 takes a zero code or the respective original codes or complements of the input parameters $x_1$, $x_2$-$x_n$ as the sub-output parameters $y_2'$-$y_n'$.

Then, in step S720, the micro-processor circuit 600 receives in parallel the sub-output parameters $y_1'$, $y_2'$-$y_n'$ through the compute module 620, and sums the sub-output parameters $y_1'$, $y_2'$-$y_n'$ to generate the summed parameter Ay'. In the present embodiment, the compute module 620 includes a plurality of adders 621, and the compute module 620 simultaneously performs the adding operation to the sub-output parameters $y_1'$, $y_2'$-$y_n'$. For example, a first layer of the adders 621 performs the adding operation to every four batches of data of the sub-output parameters $y_1'$, $y_2'$-$y_n'$, and provides adding results to a second layer of the adders 621. Deduced by analogy, the last layer of the adders 621 may output the summed parameter Ay'. In the present embodiment, each of the adders 621 may be implemented by a basic 4:2 carry save adder (CSA), and each CSA adder includes 4 inputs and 2 outputs (including sum and carry). However, the number of the adders 621 and the number of layers of the adders 621 of the compute module 620 may be correspondingly designed according to the number of the sub-output parameters $y_1'$, $y_2'$-$y_n'$, and configuration method of the adders 621 of the compute module 620 of the invention is not limited to that shown in FIG. 6. The summed parameter Ay' corresponds to a multiplication and accumulation operation result of the aforementioned equation (1).

Finally, in step S730, the micro-processor circuit 600 receives the summed parameter Ay' by using the truncation logic 630, and the truncation logic 630 performs a truncation operation based on the summed parameter Ay' to generate an output parameter y' of the neural network operation. In the present embodiment, the truncation logic 630 performs an approximation operation according to the summed parameter Ay', and the output parameter y' may be equal to or close to the output parameter y of the equation (1). In other words, within an allowable range of accuracy, the truncation logic 630 may truncate a value in the summed parameter Ay' to obtain a calculation result with enough accuracy. A method of bit truncation operation includes shifting the summed parameter Ay' according to a decimal position, and performing a saturation and round processing to the shifted value, so as to avoid an overflow for a general data width, where when the summed parameter Ay' is greater than the maximum value of the general data width or smaller than the minimum value thereof, the summed parameter Ay' is saturated to the maximum value or the minimum value of the general data width.

Therefore, the output parameter y' generated by the truncation logic 630 is the result (or an approximation result) of the neural network operation of the aforementioned equation (1). Therefore, based on the aforementioned steps S710-S730 and the architecture of the micro-processor circuit 600 of FIG. 6, the micro-processor circuit 600 of the present embodiment may adopt a resource-saving and high efficient method to effectively execute the high-precision BWN operation and the TWN operation. Moreover, encoding methods and determination conditions of the above table 5, the table 6, the equation (7) and the equation (8) may be adjusted according to different operation requirements, and the invention is not limited thereto.

In summary, the micro-processor circuit and the method of performing the neural network operation of the invention encode at least one of the input data and the weight data of the neural network operation through the parameter generation module, and generate the corresponding sub-output parameters according to the encoded data. Then, the micro-processor circuit and the method of performing the neural network operation of the invention may calculate the corresponding sub-output parameters through the compute module and the function logic to generate the output parameter of the neural network operation. Moreover, the type of the function logic of the invention may be selected according to the type of the neural network operation. Therefore, the micro-processor circuit and the method of performing the neural network operation of the invention may effectively save a computation resource of the neural network operation compared to the general micro-processor circuit, in which an arithmetic logic unit (ALU) adopts general multipliers and adders to implement multiply and add operations to generate the output parameter of the neural network operation.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A micro-processor circuit, adapted to perform a neural network operation, and comprising:
   a parameter generation circuit, receiving in parallel a plurality of input parameters and a plurality of weight parameters of the neural network operation, and generating in parallel a plurality of sub-output parameters according to the input parameters and the weight parameters;
   a compute module, coupled to the parameter generation circuit, receiving in parallel the sub-output parameters, and summing the sub-output parameters to generate a summed parameter; and
   a compare logic circuit, coupled to the compute module, receiving the summed parameter, and performing a comparison operation based on the summed parameter to generate an output parameter of the neural network operation, wherein the parameter generation circuit performs bit encoding to encode the input parameters and the weight parameters according to a value range of the weight parameters to generate a plurality of encoded input parameters and a plurality of encoded weight parameters, and the parameter generation circuit generates the sub-output parameters according to the encoded input parameters and the encoded weight parameters,
   wherein the different value ranges of the weight parameters correspond to different bit encoding,
   wherein the input parameters and the weight parameters are encoded in the same way,
   wherein a number of the weight parameters is equal to a number of the encoded weight parameters,
   wherein the parameter generation circuit generates a first bit of each of the sub-output parameters through a first sub-logic circuit according to one of the encoded input parameters and one of the encoded weight parameters of the neural network operation, and the parameter generation circuit generates a second bit of each of the sub-output parameters through a second sub-logic circuit according to the one of the encoded input parameters and the one of the encoded weight parameters of the neural network operation.

2. The micro-processor circuit as claimed in claim 1, wherein the compare logic circuit compares the number of a first value type and the number of a second value type of the sub-output parameters according to the summed parameter to determine the output parameter.

3. The micro-processor circuit as claimed in claim 1, wherein if value ranges of the input parameters and the weight parameters respectively comprise two value types, the parameter generation circuit adopts a first encoding method to encode the input parameters and the weight parameters, and the parameter generation circuit generates the sub-output parameters through a first logic circuit comprising the first sub-logic circuit and the second sub-logic circuit according to the encoded input parameters and the encoded weight parameters.

4. The micro-processor circuit as claimed in claim 1, wherein if value ranges of the input parameters and the weight parameters respectively comprise three value types, the parameter generation circuit adopts a second encoding method to encode the input parameters and the weight parameters, and the parameter generation circuit generates the sub-output parameters through a second logic circuit comprising the first sub-logic circuit and the second sub-logic circuit according to the encoded input parameters and the encoded weight parameters.

5. The micro-processor circuit as claimed in claim 4, wherein the compute module comprises:
a first sub-compute module, configured to sum values of the first bit of each of the sub-output parameters to generate a first summed parameter; and
a second sub-compute module, configured to sum values of the second bit of each of the sub-output parameters to generate a second summed parameter,
wherein the compare logic circuit compares the first summed parameter and the second summed parameter to determine the output parameter.

6. The micro-processor circuit as claimed in claim 4, wherein the compute module calculates a number of first bits having a first value in the sub-output parameters and a number of second bits having the first value in the sub-output parameters.

7. The micro-processor circuit as claimed in claim 4, wherein the compare logic circuit compares a number of first bits having a first value in the sub-output parameters and a number of second bits having the first value in the sub-output parameters to determine the output parameter.

8. The micro-processor circuit as claimed in claim 1, wherein the micro-processor circuit executes a micro-instruction to complete the neural network operation, a source operand of the micro-instruction comprises the input parameters and the weight parameters, and a destination operand of the micro-instruction comprises the output parameter of the neural network operation.

9. The micro-processor circuit as claimed in claim 1, wherein a bit width of each of the input parameters is equal to a bit width of each of the weight parameters, and a bit width of the micro-processor circuit is greater than a sum of the bit widths of the input parameters and the weight parameters.

10. A method of performing a neural network operation, adapted to a micro-processor circuit comprising a parameter generation circuit, a compute module and a compare logic circuit, the method of performing the neural network operation comprises:
receiving in parallel a plurality of input parameters and a plurality of weight parameters of the neural network operation by the parameter generation circuit, and generating in parallel a plurality of sub-output parameters according to the input parameters and the weight parameters;
receiving in parallel the sub-output parameters by the compute module, and summing the sub-output parameters to generate a summed parameter; and
receiving the summed parameter by the compare logic circuit, and performing a comparison operation based on the summed parameter to generate an output parameter of the neural network operation,
wherein the step of generating in parallel the sub-output parameters according to the input parameters and the weight parameters comprises:
performing bit encoding to encode the input parameters and the weight parameters by the parameter generation circuit according to a value range of the weight parameters, so as to generate a plurality of encoded input parameters and a plurality of encoded weight parameters; and
generating the sub-output parameters by the parameter generation circuit according to the encoded input parameters and the encoded weight parameters,
wherein the different value ranges of the weight parameters correspond to different bit encoding,
wherein the input parameters and the weight parameters are encoded in the same way,
wherein a number of the weight parameters is equal to a number of the encoded weight parameters,
wherein the parameter generation circuit generates a first bit of each of the sub-output parameters through a first sub-logic circuit according to one of the encoded input parameters and one of the encoded weight parameters of the neural network operation, and the parameter generation circuit generates a second bit of each of the sub-output parameters through a second sub-logic circuit according to the one of the encoded input parameters and the one of the encoded weight parameters of the neural network operation.

11. The method of performing the neural network operation as claimed in claim 10, wherein the step of performing the comparison operation based on the summed parameter to generate the output parameter of the neural network operation comprises:
comparing the number of a first value type and the number of a second value type of the sub-output parameters by the compare logic circuit according to the summed parameter, so as to determine the output parameter.

12. The method of performing the neural network operation as claimed in claim 10, wherein if value ranges of the input parameters and the weight parameters respectively comprise two value types, the parameter generation circuit adopts a first encoding method to encode the input parameters and the weight parameters, and the step of generating in parallel the sub-output parameters according to the input parameters and the weight parameters comprises:
generating the sub-output parameters through a first logic circuit comprising the first sub-logic circuit and the second sub-logic circuit by the parameter generation circuit according to the encoded input parameters and the encoded weight parameters.

13. The method of performing the neural network operation as claimed in claim 10, wherein if value ranges of the input parameters and the weight parameters respectively comprise three value types, the parameter generation circuit adopts a second encoding method to encode the input parameters and the weight parameters, and the step of generating in parallel the sub-output parameters according to the input parameters and the weight parameters comprises:

generating the sub-output parameters by the parameter generation circuit through or a second logic circuit comprising the first sub-logic circuit and the second sub-logic circuit according to the encoded input parameters and the encoded weight parameters.

14. The method of performing the neural network operation as claimed in claim 13, wherein the compute module comprises a first sub-compute module and a second sub-compute module, and the step of summing the sub-output parameters to generate the summed parameter comprises:

summing a value of the first bit of each of the sub-output parameters by the first sub-compute module to generate a first summed parameter; and summing a value of the second bit of each of the sub-output parameters by the second sub-compute module to generate a second summed parameter, wherein the step of performing the comparison operation based on the summed parameter to generate the output parameter of the neural network operation comprises:

comparing the first summed parameter and the second summed parameter by the compare logic circuit to determine the output parameter.

15. The method of performing the neural network operation as claimed in claim 13, wherein the compute module calculates a number of first bits having a first value in the sub-output parameters and a number of second bits having the first value in the sub-output parameters.

16. The method of performing the neural network operation as claimed in claim 13, wherein the compare logic circuit compares a number of first bits having a first value in the sub-output parameters and a number of second bits having the first value in the sub-output parameters to determine the output parameter.

* * * * *